May 12, 1942.  W. L. CHURCH ET AL  2,282,455

VALVE ASSEMBLY

Filed March 25, 1939

Inventors
WALTER L. CHURCH
WILLIAM K. HOLLERON

By E. V. Hardway,
Attorney

Patented May 12, 1942

2,282,455

UNITED STATES PATENT OFFICE 2,282,455

VALVE ASSEMBLY

Walter L. Church, Houston, and William K. Holleron, Harlingen, Tex.

Application March 25, 1939, Serial No. 264,078

6 Claims. (Cl. 251—102)

This invention relates to a valve assembly.

An object of the invention is to provide a valve assembly particularly adapted for use in a drill stem or other conduit provided for the conduction of liquid containing abrasive material. However, the assembly may be used for controlling the flow of fluid through conduits wherever desired.

Another object of the invention is to provide an assembly of the character described wherein the valve is of such construction as to effectively exclude the abrasive substances in the liquid from the working parts of the valve.

A further feature of the invention resides in the provision of a novel type of sectional valve of such construction that it may be readily released while being turned from one position to another to reduce its friction with the surrounding seat.

With the above and other objects in view, the invention has particular relation to certain novel features of construction, operation and arrangement of parts, an example of which is given in this specification and illustrated in the accompanying drawing, wherein.

Figure 3:
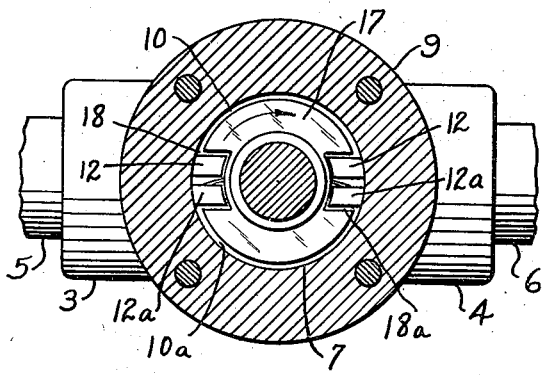
Figure 3 shows a cross sectional view taken on the line 3—3 of Figure 1.
Figure 4:
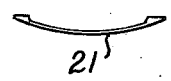
Figure 4 shows an edge view of an expansion spring employed.

Referring now more particularly to the drawing wherein like numerals of reference designate the same parts in each of the figures, the numeral 1 designates the valve casing having the flowway 2 therethrough and having the end connections 3, 4 for the connection of adjacent sections 5, 6 of the flow conduit. The valve casing has a cylindrical bore therein at right angles to the axis of the flowway 2 and forming a seat 7. The inner end of the seat is closed by the casing and is provided with a circular recess 8 and the outer end of the bore or seat 7 is closed by the cover plate 9 which is bolted on to the casing 1. A sectional cylindrical valve is fitted snugly into the seat and is formed of semi-cylindrical complemental sections 10, 10a. At their inner ends these sections terminate in the reduced half round extensions 11, 11a which fit into the recess 8 and form a pivot on which the valve turns. At the other end of the valve the sections terminate in the spaced lugs 12, 12 and 12a, 12a on the respective sections 10, 10a and provided for a purpose to be hereinafter stated.

There is a valve stem 13 whose outer end is formed polygonal to receive a wrench and whose inner end is enlarged thus forming the outwardly facing annular shoulder 14. Opposite this shoulder the cover plate 9 is countersunk, forming an inside inwardly facing annular shoulder 15 and between the shoulders 14, 15 and surrounding said stem there is a thrust ring 16.

Figure 1:
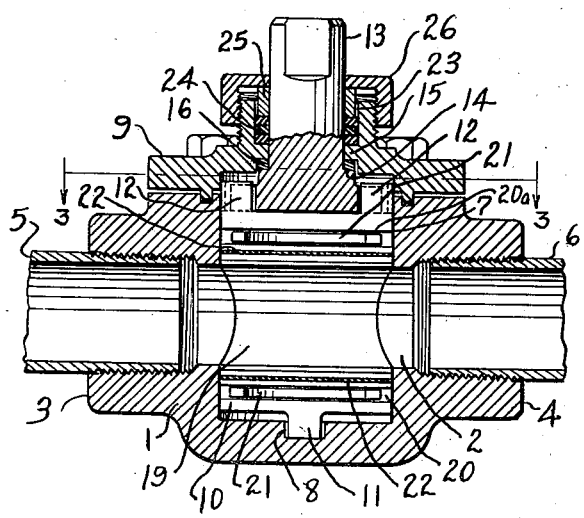
Figure 1 shows a sectional view of the valve taken on the line 1—1 of Figure 2.
Figure 2:
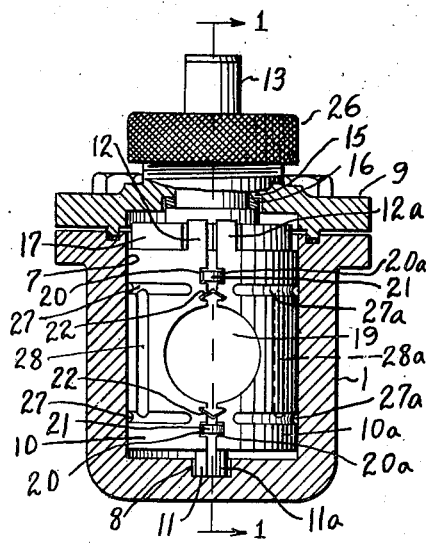
Figure 2 shows a sectional view taken at right angles to the view shown in Figure 1.

The inner end of the stem 13 is formed into a disc 17, provided with the opposing marginal notches 18, 18a to receive the corresponding lugs 12, 12a as more clearly shown in Figures 2 and 3. The valve is formed with a flowway 19 therethrough arranged to be brought into and out of alignment with the flowway 2 and on opposite sides of the flowway 19 the facing sides of the valve sections 10, 10a are provided with registering grooves as 20, 20a, to receive the correspondingly bowed springs 21, 21 whereby the sections, 10, 10a are maintained spread apart and held closely in contact with the surrounding seat 7 of the casing. Spaced inwardly from the springs 21, 21 are the packing strips or sealing members 22, 22. These strips are preferably V-shaped in cross section and diverge inwardly as illustrated in Figure 2 and extend entirely across the valve from wall to wall of the seat as shown in Figure 1. Their margins are seated in suitable registering grooves in the facing sides of the valve sections as illustrated in Figure 2. These packing strips or sealing members serve to exclude the gritty substances in the fluid from the working parts of the valve.

The cover plate 9 is formed with a packing box 23 to receive the packing 24 which closely surrounds the stem 13 and which is held compressed by an inside gland 25 and a flanged nut 26 screwed on to the packing box and abutting against said gland whereby the compression on the packing may be regulated.

The valve sections are provided with external arcuate lubricant grooves 27, 27 and 27a, 27a which are connected by longitudinal external grooves 28, 28a for containing a suitable lubricant to maintain the valve adequately lubricated.

As shown in Figure 1, the valve is in open position, permitting free flow of liquid through the flowways 2, 19. Grit will be excluded by the sealing members 22, 22, from the working parts as hereinabove explained and the valve sections will be held tightly seated against the seat 7, both by the pressure of the springs 21 as well as by the pressure of the liquid. If it be now desired to close the valve, the stem 13 may be turned, for example, to the right as indicated by the arrow in Figure 3, thus causing the advancing ends of the notches 18, 18a, to engage the corresponding lugs 12 and 12a of the valve sections, thus moving the sections toward each other or contracting them away from the seat 7, and in the direction of rotation, thus relieving the friction between the valve and the seat 7 during the turning movement. It will be noted from the inspection of Figure 3 that the ends of the notches 18, 18a are spaced an appreciable distance from the corresponding lugs 12, 12a, so that in the event the valve becomes stuck against the seat, the stem 13 may be oscillated with a hammer-like effect, thus jarring the sections of the valve loose. A reverse rotation of the stem will open the valve, said valve being contracted by the ends of the notches 18, 18a against the other lugs 12, 12a, thus again releasing the valve sections from the walls of the seat thus making it relatively easy to open the valve under high pressures and the jarring action above alluded to may be utilized in opening the valve.

The grooves 27, 27a, 28, 28a, may be filled, and kept filled, with a suitable lubricant in any preferred manner.

The sections of the valve may be ground to the same radius as that of the bore or seat 7 and without any external taper, thus giving better sealing action and making the valve operate or turn more readily.

The drawing and description are illustrative merely, while the broad principle of the invention will be defined by the appended claims.

What we claim is:

1. A valve assembly comprising a casing having a flowway therethrough and an approximately cylindrical bore at substantially right angles to the flowway, an approximately cylindrical valve formed of longitudinal sections in the bore and having a passageway therethrough, means for turning the valve to bring said passageway into and out of registration with the flowway through the casing, yieldable means between said sections and sealing members between the sections on opposite sides of the passageway extending across the valve.

2. A valve assembly comprising a valve casing having a flowway therethrough and provided with a bore at approximately right angles to the flowway forming a seat, a valve in said bore whose external surface is shaped to conform to the contour of said seat, said valve being formed of longitudinal sections, yieldable means normally expanding said sections against the seat, means for turning the valve and operative connections between said turning means and the valve sections to contract the valve upon turning movement thereof in either direction and seals between said sections extending entirely across the valve on opposite sides of said passageway.

3. A valve assembly comprising a valve casing having a flowway for liquid therethrough and having a bore therein across the flowway and forming a seat, a turnable valve in the bore formed of longitudinal, complementary sections, yieldable means between the sections normally holding them in contact with the seat, a stem mounted on the casing, interengaging means carried by the stem and the sections respectively arranged to relax the sections from the seat upon turning movement of the valve in either direction, the valve having a passageway therethrough positioned to be brought into and out of registration with said flowway and seals on opposite sides of said passageway between said sections arranged to prevent the escape of fluid between said sections from said passageway.

4. A valve assembly comprising a valve casing having a flow way therethrough and having an approximately cylindrical seat across the flow way, an approximately cylindrical valve fitted in the seat and having a transverse passageway therethrough and turnable to bring the passageway into and out of registration with the flow way, said valve being formed of two, semi-cylindrical sections and having transverse grooves on opposite sides of the passageway, packing in the grooves and extending across the sections.

5. A valve assembly comprising a valve casing having a flowway therethrough and having an approximately cylindrical seat across the flowway, an approximately cylindrical valve in the seat and having a transverse passageway therethrough, said valve being rotatable to bring the passageway into and out of registration with the flowway, said valve being formed of two semicylindrical sections and having transverse grooves on opposite sides of the passageway, elongated packing in the grooves extending substantially across the valve.

6. A valve assembly comprising a valve casing having a flowway therethrough and having an approximately cylindrical valve seat across the flowway, a valve conforming in shape to and fitting in the seat and divided, on an axial plane, into two, similar, longitudinal, half round sections which are solid and which have a passageway between them movable into and out of alignment with said flowway as the valve is turned, sealing means between the sections and extending entirely across the valve on each side of the passageway, a stem for turning the valve, connections between the stem and the valve sections arranged to simultaneously relax the leading edges of the sections from the seat as the valve is turned by the stem.

WALTER L. CHURCH.
WILLIAM K. HOLLERON.